Patented Feb. 24, 1948

2,436,614

UNITED STATES PATENT OFFICE 2,436,614

SOLID STYRENE POLYMER FORMATION AT LOW TEMPERATURES

William J. Sparks, Cranford, Henry B. Kellog, Union City, and Donald C. Field, Linden, N. J., assignors to Standard Oil Development Company, a corporation of Delaware No Drawing. Application July 10, 1942, Serial No. 450,410

3 Claims. (Cl. 260—91)

This invention relates to low temperature polymerization processes, relates particularly to low temperature polymerization media in which a polymerizable monomer and polymer are soluble; and relates especially to low temperature polymers and processes for the polymerization of styrene and its homologues.

Styrene is known to be capable of polymerizing readily into high molecular weight resinous polymers, having very valuable physical properties; since it has good strength, good hardness, transparency, and many other desirable characteristics. However, the polymerization procedure as practiced at or above room temperature is tedious and unsatisfactory, particularly because of the very slow rate at which polymerization occurs; and, in addition, the polymerization procedure does not yield the utmost in physical properties. Furthermore, if the polymerization is conducted upon the styrene per se, it yields a solid resin which is not easy to pulverize and prepare for further working. Also, if the polymerization is conducted upon styrene dissolved in a solvent at room temperature, it is found to be extremely difficult to remove the solvent; and the presence of even traces of solvent is harmful to the physical properties of the polymer. Likewise, when the polymerization is conducted upon emulsions of styrene, it is found to be difficult to remove the emulsifying agent, the presence of even traces of which also seriously harms the physical properties of the polymer.

It is now found that styrene alone or styrene and its homologues is soluble in a number of low freezing solvents, particularly the alkyl halides; maintains its solubility therein when cooled to temperatures ranging from $-78°$ C. to $-103°$ C. or $-150°$ C. and at such temperatures polymerizes readily and very rapidly upon the application of a Friedel-Crafts type catalyst to yield a polystyrene of substantially improved properties. The resultant polymer may precipitate, at the low temperature, from solution by virtue of the character of the solvent utilized; or the polymer may be precipitated from the solution by the addition thereto of a precipitant; either procedure yielding the polymer in a particularly advantageous granular form, free from all objectionable impurities.

Thus, the invention polymerizes styrene alone or in admixture with its homologues at low temperatures by the application of a Friedel-Crafts type catalyst, preferably in solution, to the styrene solution; the polymer thereafter either precipitating from the solution as it forms, or being precipitated by a suitable precipitant. Other objects and details of the invention will be apparent from the following description.

In practicing this invention, styrene, or its homologues, such as alpha methyl styrene, or para methyl styrene, or alpha methyl para methyl styrene, or indene or vinyl naphthalene, vinyl aromatics and the like, are dissolved in alkyl halide having less than about 6 carbon atoms per molecule, or in a poly halide of less than about 6 carbon atoms per molecule; and they remain soluble in these solvents at practically any temperature down to the freezing point of the solvent; these temperatures ranging from $-78°$ C. to $-103°$ C. or lower to the freezing point of the selected solvent. Suitable solvents are methyl chloride, or ethyl chloride, or methyl dichloride. Also, with certain catalysts, hydrocarbon solvents are suitable, including petroleum ether, propane, butane, pentane and the similar low boiling hydrocarbons. At these reduced temperatures, the styrene monomer polymerizes readily by the application of a Friedel-Crafts type catalyst, such as aluminum chloride or the like, especially when dissolved in an alkyl halide such as ethyl or methyl chloride, or other of the above-indicated solvents. The list of available Friedel-Crafts catalysts is particularly well shown in the article by N. O. Calloway in the issue of "Chemical Reviews" published by the American Chemical Society at Baltimore in 1935, being volume XVII, number 3, the article beginning on page 327, the list being particularly well shown on page 375.

The styrene solution is preferably cooled by the application of a refrigerant jacket to the container holding the styrene solution. The jacket may desirably contain liquid ethylene, or isopropyl alcohol mixed with solid carbon dioxide, or other suitable refrigerant capable of cooling the styrene solution to temperatures well below $0°$ C. Upon application of the catalyst, the polymerization proceeds promptly to yield a highly satisfactory polymer, which generally remains in solution. The residual catalyst is readily destroyed by adding water or alkali solution or other similar substance to the solution and the polymer may be recovered by precipitating it with alcohol, or similar precipitant.

The reaction mixture of the invention may utilize, per 100 parts of reactant, from 100 parts to 700 or 800 or even 900 parts of diluent, depending upon the nature of the diluent and the solubility of the reactant therein. The reactants may consist of a single styrene type of compound, either styrene per se or any of the various substituted styrenes. Alternatively, the reactant may consist of mixtures of styrene and a substituted styrene, or may consist of mixtures of the various substituted styrenes, with or without styrene itself in addition; about the minimum amount of any given second component being approximately 10%. Likewise, other reactants may be included, usually in a proportion above a minimum of 5%. The catalyst preferably is a solution of a Friedel-Crafts catalyst in a liquid solvent; the concentration of the solution varying according to both the Friedel-Crafts catalyst and the solvent; the minimum suitable concentration being approximately 0.1% of halide material in solvent, the top limit being approximately 6.0% of the halide catalyst in alkyl halide solvent. The aluminum chloride, which is preferred, usually is used in the range of from 0.1% to 2% solution; the boron fluoride catalyst may vary in concentration from approximately 1%, when it is dissolved in an alkyl halide, to about 50% when dissolved in an alkyl halide, and to about 65% to 70% when it is dissolved in water. The polymerization is preferably conducted at a temperature well below room temperature; the usable temperature range being from about $-78°$ C. to about $-150°$ C., the preferred temperature range being from about $-78°$ C. to about $-103°$ C.

*Example I*

A mixture was prepared consisting of 300 parts of styrene with 900 parts of ethyl chloride. This mixture was placed in a reactor having a good stirrer and a refrigerating jacket containing ethylene. When the solution was cooled to approximately $-103°$ C., a solution of aluminum chloride in methyl chloride, having a concentration of 0.6% $AlCl_3$ by weight, was added to the styrene solution, in the form of a fine spray applied to the surface of the solution; the total amount of catalyst solution applied being approximately 3 parts by weight. The polymerization began promptly, and the catalyst spray was continued for a time of 2 minutes. A substantial amount of heat was liberated, but no solid polymer precipitated. The mixture was then treated with approximately 50 parts by weight of isopropyl alcohol. This caused the polymer to precipitate as a granular precipitate. The granular precipitate was then separated from the solvent and precipitant and washed with alcohol and water to remove any residual catalyst or precipitant. After drying, the polymer was in particularly advantageous form for molding operations, and when compacted under heat and pressure, it yielded a water-white resin of unusually high strength and substantially reduced brittleness as compared to other types of polymeric styrene. The total polymerization time amounted to about 3 minutes, which is in conspicuous contrast to the normal polymerization time of hours or days at room temperature; and the resulting polymer appeared to be of considerably higher molecular weight than is obtainable by the ordinary room temperature polymerization process. The yield of polymer amounted to 90% of the amount of styrene introduced.

*Example II*

A mixture much like that of Example I was prepared, consisting of 300 parts by volume of styrene with 900 parts by volume of methyl chloride. This mixture was placed in a reactor equipped with a stirrer and a refrigerating jacket containing liquid ethylene. When the solution was cooled to approximately $-103°$ C., a solution of aluminum chloride in methyl chloride, having a concentration of 0.6% $AlCl_3$ by weight, was added and stirred in rapidly; the total amount of catalyst, as before, being approximately 3 parts. As before, a substantial amount of heat was liberated, but no solid polymer precipitated. The polymer was thereafter obtained by precipitation from the mixture through the agency of isopropyl alcohol as a precipitant.

The process of the present invention is applicable to other styrene type compounds by means of the Friedel-Crafts type catalysts as above indicated.

*Example III*

A mixture was prepared consisting of 50 parts styrene with 50 parts of para-methyl-alpha-methyl styrene, by weight, in 350 parts, by weight, of petroleum ether. The mixture was cooled to a temperature of approximately $-78°$ C. by the application of an external refrigerating jacket, containing a mixture of solid carbon dioxide and isopropyl alcohol. When the temperature has gone to about $-72°$ C., 1.5 parts by weight of a catalyst consisting of boron trifluoride and water in the proportion of 1 mole of $BF_3$ with 1½ moles of water was then added slowly while the mixture was rapidly stirred. After a time interval between 10 and 30 secs., the polymerization reaction occurred, and a fine-grained slurry of the polymer in the petroleum ether was obtained; the solid polymer settling rapidly to the bottom of the reaction vessel. The yield obtained was approximately quantitative; practically all of the styrene and para-methyl-alpha-methyl styrene originally mixed being found in the solid interpolymer. Approximately 50 parts by weight of isopropyl alcohol was then added to the reaction mixture to insure the precipitation from the liquid of all of the polymer and to destroy any residual catalyst. The solid polymer was then filtered from the liquid, washed several times with isopropyl alcohol and then dried under vacuum. The dried interpolymer was in the form of a fine powder which was particularly desirable for molding operations.

*Example IV*

A mixture of 50 parts by weight of styrene with 50 parts by weight of para-methyl-alpha-methyl styrene was dissolved in 350 parts by weight of methyl chloride in a reactor equipped with a refrigerating jacket containing liquid ethylene. To this mixture there was then added approximately 5 parts by weight of a solution of aluminum chloride in methyl chloride of about 0.6% concentration, as catalyst. In this instance also, the yield was approximately quantitative in the form of fine-grained slurry which, as in Example 3, was treated with isopropyl alcohol, washed and dried. This polymer had a molecular weight of about 100,000.

It is to be noted that when using a larger amount of solvent-diluent than that prescribed in Examples III and IV, the interpolymer formed appears to precipitate in a finer grained slurry. The solvent-diluent employed in Example III may be either petroleum ether, propane, butane, pentane or any other hydrocarbon having a melting point below $-78°$ C.

The above example shows the use of a considerable quantity of solvent-diluent. The quantity of solvent-diluent may be varied considerably and such variation exerts a very great effect upon the grain size of the resulting granular polymeric precipitate. If the quantity of methyl chloride is reduced, say to 175 parts, the size of the particles making up the grain of polymer is increased. Similarly, if the quantity of methyl chloride is increased, say to 700 parts, the particle size is greatly reduced.

*Example V*

Another mixture was prepared consisting of 100 parts by weight of alpha methyl styrene with 300 parts by weight of methyl chloride. This mixture was placed in a reactor equipped with a refrigerating jacket containing liquid ethylene and the temperature brought down to approximately −103° C. To the cold reaction mixture there was then added approximately 5 parts by weight of a solution of aluminum chloride in methyl chloride of 0.5% concentration as catalyst. The reaction proceeded rapidly to yield a white fluffy powder which was insoluble in gasoline, but swelled slowly to a viscous gel on prolonged contact with gasoline hydrocarbons.

*Example VI*

A mixture was prepared consisting of 50 parts by weight of styrene, 50 parts by weight of dimethallyl with 300 parts by weight of methyl chloride. This mixture, likewise, was cooled in a jacketed reactor to approximately −103° C. and was then treated with approximately 10 parts of a solution of aluminum chloride in methyl chloride containing 0.5% of aluminum chloride. The polymerization reaction proceeded promptly to yield a powdery polymer precipitate which, likewise, was thermoplastic and of good strength.

*Example VII*

A mixture was prepared consisting of 25 parts by weight of styrene, 75 parts by weight of propylene and 300 parts by weight of methyl chloride. This mixture, likewise, was cooled to approximately −103° C., and treated as before with approximately 20 parts of a solution of aluminum chloride in methyl chloride containing 1.5% of aluminum chloride. The resulting polymer was a heavy, very viscous oil which was readily soluble in hydrocarbons, particularly in lubricating oil, and was an excellent thickener which raised the viscosity and the viscosity index of the lubricating oil in a highly advantageous manner.

*Example VIII*

A mixture was prepared consisting of 75 parts by weight of styrene with 25 parts by weight of methallyl chloride and 300 parts of methyl chloride. This mixture, likewise, was cooled to approximately −103° C., and polymerized by the addition thereto of approximately 10 parts of a 0.6% solution of aluminum chloride in methyl chloride. The reaction proceeded promptly to completion to yield a powder which was thermoplastic and highly advantageous for molding and impregnating purposes. This material was particularly advantageous because of the presence of considerable amounts of chlorine in the molecule which markedly reduced its combustibility.

The above examples show the reaction conducted at relatively quite low temperature of −78° C. and −103° C. The minimum temperature in the experiments of −103° C. is not a minimum limit, but the minimum temperature is at least below −150° C., as may be obtained by refrigerants under reduced pressure in a refrigerating jacket. The reaction proceeds reasonably well, even at temperatures below the freezing point of ethyl or methyl chloride, since the catalyst solution, in turn, is soluble in the reaction mixture, especially when some of the very low freezing petroleum diluents are used. It is, of course, to be noted that in any given instance, the minimum usable temperature is set by the freezing point of the diluent used which, with methyl chloride, is −138.7° C., but with various of the petroleum substances may be substantially lower. Also, various other substances are useful in the reaction. All of the substituted styrenes are useful for the reaction, for the production of the simple polymer, and for interpolymers of several of the various substituted styrenes and styrene itself. Likewise, for other interpolymers, various other olefins are useful, including propylene, the normal butylenes, and some of the higher olefins, including the amylenes and hexylenes. As auxiliary third component interpolymerizates, various of the diolefins, including butadiene and most of the substituted butadienes, are usable. Likewise, co-reactants, vinyl acetylene, vinyl naphthalene, the various vinyl ethers and many other unsaturated substances are useful.

Some of the various solid polymers and interpolymers prepared according to the invention are obtained in the form of fine-grained slurries in the solvent-diluent. They are readily separated by filtration and decantation from the solvent-diluent and are readily dried to yield a fine powder of the polymer, which is particularly suitable for thermoplastic molding operations, especially with fillers such as the inert inorganic pigments, including carbon black, rouge, barytes, the various chrome pigments, clays and the like, and also with various organic fillers such as wood flour, cotton linters, as well as other fibers, such as asbestos, and even woven fabrics. The powdered polymer, especially in admixture with powdered fillers, is particularly convenient for injection molding.

The polymers or interpolymers are compatible with other iso-olefinic polymers, such as the low temperature interpolymers of isobutylene with minor proportions of butadiene. They are likewise compatible with high pressure ethylene polymer and with the emulsion polymers of butadiene and emulsion polymers of butadiene with other unsaturates such as styrene or acrylonitrile. In these admixtures, they yield increased toughness and flexibility and at the same time show highly advantageous electrical characteristics in the way of unusually low phase angle and power factor values; as well as phenomenally high insulation resistance and excellent breakdown voltages. In addition, they are readily extruded, and in suitable mixtures are sufficiently flexible for use as insulating coverings on wire, or may be molded in sufficiently hard state to serve as insulators and insulating supports.

Thus, the invention is a new and useful process for polymerizing styrene and styrene type of compounds, either alone or into interpolymers with other unsaturated compounds, to yield high molecular weight resinous polymers of superior strength and toughness, and improved elasticity.

While there are above disclosed but a limited number of embodiments of the invention, it is possible to produce still other embodiments without departing from the inventive concept herein disclosed and it is, therefore, desired that only such limitations be imposed upon the appended claims as are stated therein or required by the prior art.

The invention claimed is:

1. A process for polymerizing vinyl aromatic hydrocarbons, which comprises forming a solution containing as a sole polymerizable material a compound selected from the group consisting of styrene, alpha methyl styrene, para methyl styrene and alpha methyl para methyl styrene in an alkyl chloride having 1 to 2 carbon atoms per molecule, cooling the solution to a polymerization temperature between $-78°$ C. and $-103°$ C. and polymerizing the polymerizable material at the said polymerization temperature while said polymerizable material remains in solution and the alkyl chloride remains liquid and in the presence of a Friedel-Crafts catalyst dissolved in an alkyl chloride having 1 to 2 carbon atoms per molecule and being liquid at said polymerization temperature to produce a solid resinous polymer.

2. A process according to claim 1, wherein the Friedel-Crafts catalyst comprises aluminum chloride.

3. A process for polymerizing styrene to form polystyrene resins, which comprises dissolving styrene in methyl chloride, cooling the solution to a polymerizing temperature of $-103°$ C. and adding a solution of aluminum chloride in methyl chloride to produce a polystyrene in a methyl chloride solution.

WILLIAM J. SPARKS.
HENRY B. KELLOG.
DONALD C. FIELD.

REFERENCES CITED

The following references are of record in the file of this patent:

UNITED STATES PATENTS

| Number | Name | Date |
|---|---|---|
| 2,317,878 | Bannon | Apr. 27, 1943 |

FOREIGN PATENTS

| Number | Country | Date |
|---|---|---|
| 106,371 | Australia | Jan. 26, 1939 |
| 513,521 | Great Britain | Oct. 16, 1939 |
| 848,411 | France | Oct. 30, 1939 |

OTHER REFERENCES

Schulz and Husemann, Zeit. Physik. Chem. (1936), B34, pages 187, etc., especially page 209.